United States Patent
Vaishnav et al.

(10) Patent No.: US 11,548,381 B2
(45) Date of Patent: Jan. 10, 2023

(54) VEHICLE FUEL-STORAGE TANK WITH ANTI-SLOSH ELEMENTS

(71) Applicant: FORD GLOBAL TECHNOLOGIES, LLC, Dearborn, MI (US)

(72) Inventors: Dhaval Vaishnav, Canton, MI (US); Enrique Lopez Hernandez, Toluca de Lerdo (MX); Luis Felipe Blas Martinez, Jilotepec (MX); Kristian Ulyses Flores Aviña, Anáhuac I Seccion (MX); Miguel Angel Leon Guerrero, Ecatepec de Morelos (MX); Virginia Ortega Conde, Alvaro Obregon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/306,134

(22) Filed: May 3, 2021

(65) Prior Publication Data
US 2022/0348074 A1 Nov. 3, 2022

(51) Int. Cl.
*B60K 15/077* (2006.01)
*B60K 15/03* (2006.01)

(52) U.S. Cl.
CPC .... *B60K 15/077* (2013.01); *B60K 2015/0344* (2013.01); *B60K 2015/0775* (2013.01); *B60K 2015/0777* (2013.01)

(58) Field of Classification Search
CPC .......... B60K 15/077; B60K 2015/0344; B60K 2015/0775; B60K 2015/0777
See application file for complete search history.

(56) References Cited

U.S. PATENT DOCUMENTS

| | | | |
|---|---|---|---|
| 6,568,556 B1 | 5/2003 | Kahler, Jr. et al. | |
| 6,736,282 B2 | 5/2004 | Krogull | |
| 7,261,323 B2 | 8/2007 | Grant | |
| 7,445,082 B2 | 11/2008 | Nakanii et al. | |
| 7,648,749 B1 | 1/2010 | Taylor | |
| 8,235,241 B2 | 8/2012 | Ramsay | |
| 8,276,779 B2 | 10/2012 | Bae | |
| 2001/0009257 A1 | 7/2001 | Bauer | |
| 2003/0015537 A1 | 1/2003 | Konja | |
| 2003/0038136 A1 | 2/2003 | Bauer | |
| 2011/0017748 A1 | 1/2011 | Palma et al. | |
| 2011/0155743 A1 | 6/2011 | Jacob et al. | |
| 2011/0278305 A1 | 11/2011 | Chun | |
| 2012/0138606 A1* | 6/2012 | Varga | B60K 15/03177 220/4.21 |
| 2014/0144915 A1 | 5/2014 | Lee et al. | |

* cited by examiner

*Primary Examiner* — Andrew T Kirsch
(74) *Attorney, Agent, or Firm* — Vincent Mastrogiacomo; Brooks Kushman P.C.

(57) ABSTRACT

A fuel-storage tank for a vehicle includes a body defining an interior volume having a floor and a ceiling and configured to store fuel. The tank further includes an anti-slosh reinforcement column extending between the floor and the ceiling. The anti-slosh reinforcement column has a vertical baffle extending between the floor and the ceiling. The vertical baffle has opposing first and second major faces and edges extending therebetween. A horizontal baffle of the column has upper and lower major faces and edges extending therebetween. The horizontal baffle is rigidly supported on the vertical baffle such that the first and second major faces are substantially perpendicular to the upper and lower major faces.

20 Claims, 4 Drawing Sheets

VEHICLE FUEL-STORAGE TANK WITH ANTI-SLOSH ELEMENTS

TECHNICAL FIELD

This disclosure relates to automotive vehicles and more particularly to fuel-storage tanks with anti-slosh elements.

BACKGROUND

A vehicle may include an engine that operates on liquid hydrocarbon fuel such as gasoline or diesel. The fuel is stored in a fuel tank, which is typically attached to an underside of the vehicle. A fuel-delivery system supplies fuel from the fuel tank to the engine.

SUMMARY

According to one embodiment, a fuel-storage tank for a vehicle includes a body defining an interior volume configured to store fuel and a plurality of anti-slosh reinforcement columns extending between a floor and a ceiling of the interior. At least one of the columns including upper and lower mounts attached to the ceiling and floor, respectively, a planar vertical baffle extending from the lower mount to the upper mount and having first and second opposing major faces, and a planar horizontal baffle rigidly supported on the vertical baffle to suspend the horizontal baffle between the upper and lower mounts. The horizontal baffle has a first portion extending from the first face and a second portion extending from the second face.

According to another embodiment, a fuel-storage tank for a vehicle includes a body defining an interior volume having a floor and a ceiling and configured to store fuel. The tank further includes an anti-slosh reinforcement column extending between the floor and the ceiling. The anti-slosh reinforcement column has a vertical baffle extending between the floor and the ceiling. The vertical baffle has opposing first and second major faces and edges extending therebetween. A horizontal baffle of the column has upper and lower major faces and edges extending therebetween. The horizontal baffle is rigidly supported on the vertical baffle such that the first and second major faces are substantially perpendicular to the upper and lower major faces.

According to yet another embodiment, a fuel-storage tank for a vehicle includes a body defining an interior volume configured to store fuel, a first reinforcement column, and a second reinforcement column. The reinforcement columns extend between a floor and a ceiling of the body. The first reinforcement column has a planar vertical baffle and a planar horizontal baffle being rigidly supported on the vertical baffle. The second reinforcement column has a planar vertical baffle and a pair of planar horizontal baffles vertically spaced from each other. The pair of horizontal baffles are rigidly supported on the vertical baffle of the second column.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle may include an engine that operates on liquid-hydrocarbon fuel such as gasoline or diesel. Used herein, "fuel" refers to a liquid fuel. A fuel system delivers fuel to the engine. The fuel system includes fuel injectors configured to inject fuel into an associated one of the cylinders or an intake manifold. The fuel injectors are connected to fuel rails that receive pressurized fuel from a fuel pump. The fuel pump receives fuel from a fuel-storage tank and may be disposed in the tank.

Figure 1:
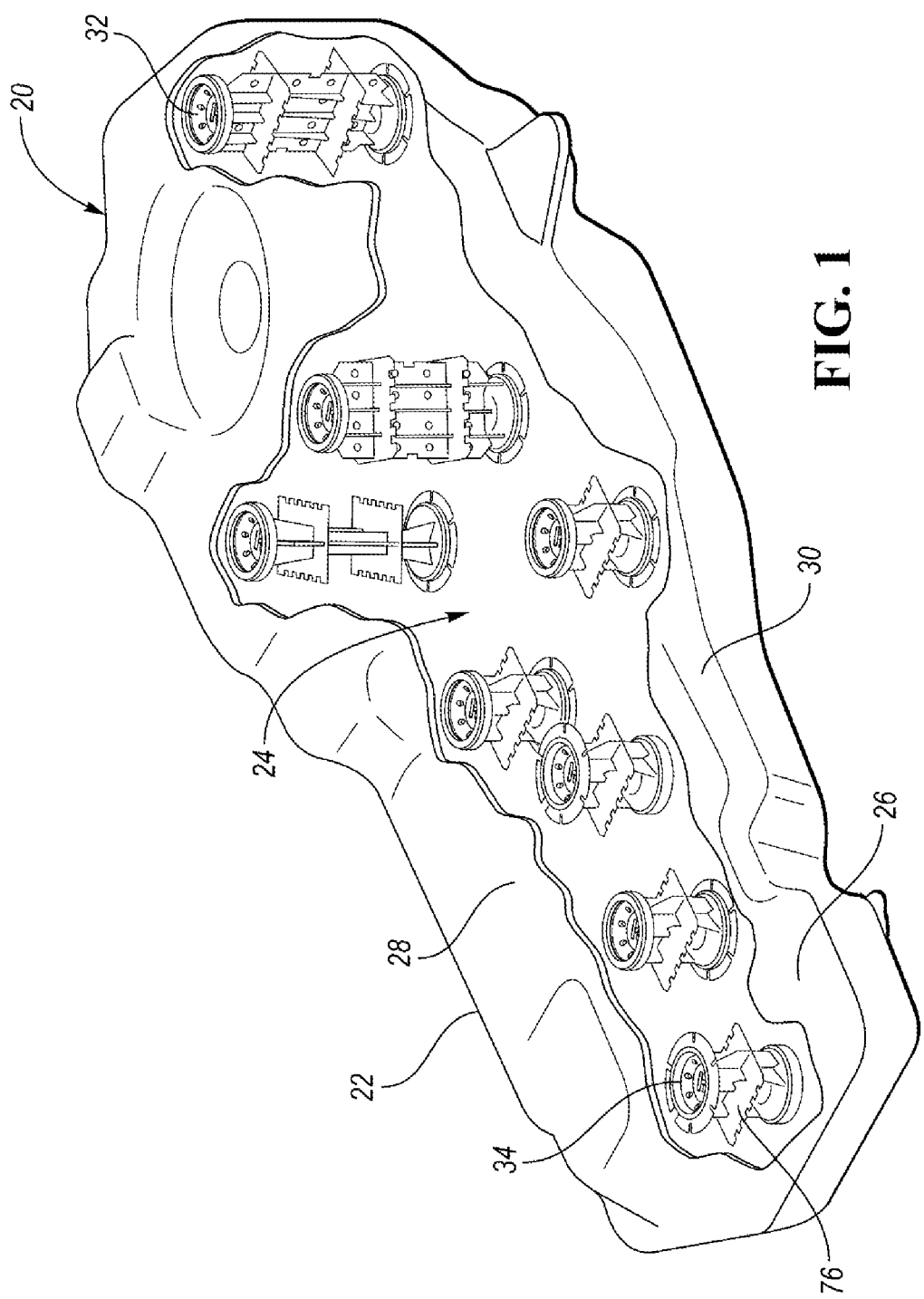
FIG. 1 is a cutaway perspective view of a fuel tank according to one or more embodiments of this disclosure.

Referring to FIG. 1, an example fuel-storage tank 20 includes a body 22 defining an interior 24 configured to store fuel. The interior 24 includes a floor 26, a ceiling 28, and one or more sidewalls 30. The body 22 may be formed of plastic, metal, or any other material suitable for storing fuel. The fuel tank 20 may be attached to an underside of a vehicle body by mounting hardware (not shown).

Movement of the vehicle may cause the fuel to move within the interior (referred to as slosh) creating undesirable noise, vibrations, stress, and potential starvation of the fuel pump. Noise is generated as airborne noise and as structure-borne noise. The sloshing fuel creates vibrations that are transferred through the tank structure. From there, the noise propagates as secondary airborne noise and as structure-borne noise into the passenger compartment. Slosh noise may be a more of an issue in hybrid vehicles due to the absence of background engine noise when in EV mode. Sloshing liquid also exerts dynamic forces on the tank mounting system (e.g., straps and brackets). The forces can cause durability issues especially for heavy-duty vehicles that have larger fuel tanks and engage in significant off-road driving.

Apart from the slosh noise, another issue is maintaining structural durability of the tank, which may be plastic. Fuel tanks for hybrid vehicles may be sealed from the atmosphere to prevent fuel evaporative emissions from saturating the carbon canister and ultimately leaking into atmosphere. Because of this, a fuel tank for a hybrid vehicle may be designed to withstand high internal pressure. For this reason, fuel tanks for hybrid vehicles may have internal reinforcement columns located strategically to avoid fuel tank deformations due to engine vacuum cycles and high internal pressures. The reinforcement columns also make it difficult to implement conventional slosh noise mitigation solutions such as internal fencing that span the tank.

The fuel tank 20 has special reinforcement columns that also deter sloshing. That is, the reinforcement columns provide structural stability to the fuel tank and control the flow of fuel to reduce slosh. These reinforcement columns may be particularly advantageous in sealed fuel tanks that can have increased vapor pressure and vacuum verse their vented counterparts. The fuel tank 20 includes a first set of anti-slosh reinforcement columns 32 and a second set of anti-slosh columns 34 that each extend between the floor 26 and the ceiling 28. These anti-slosh reinforcement columns are strategically placed within the interior 24 and cooperate to reduce slosh and provide the desired structural reinforcement.

Figure 2:
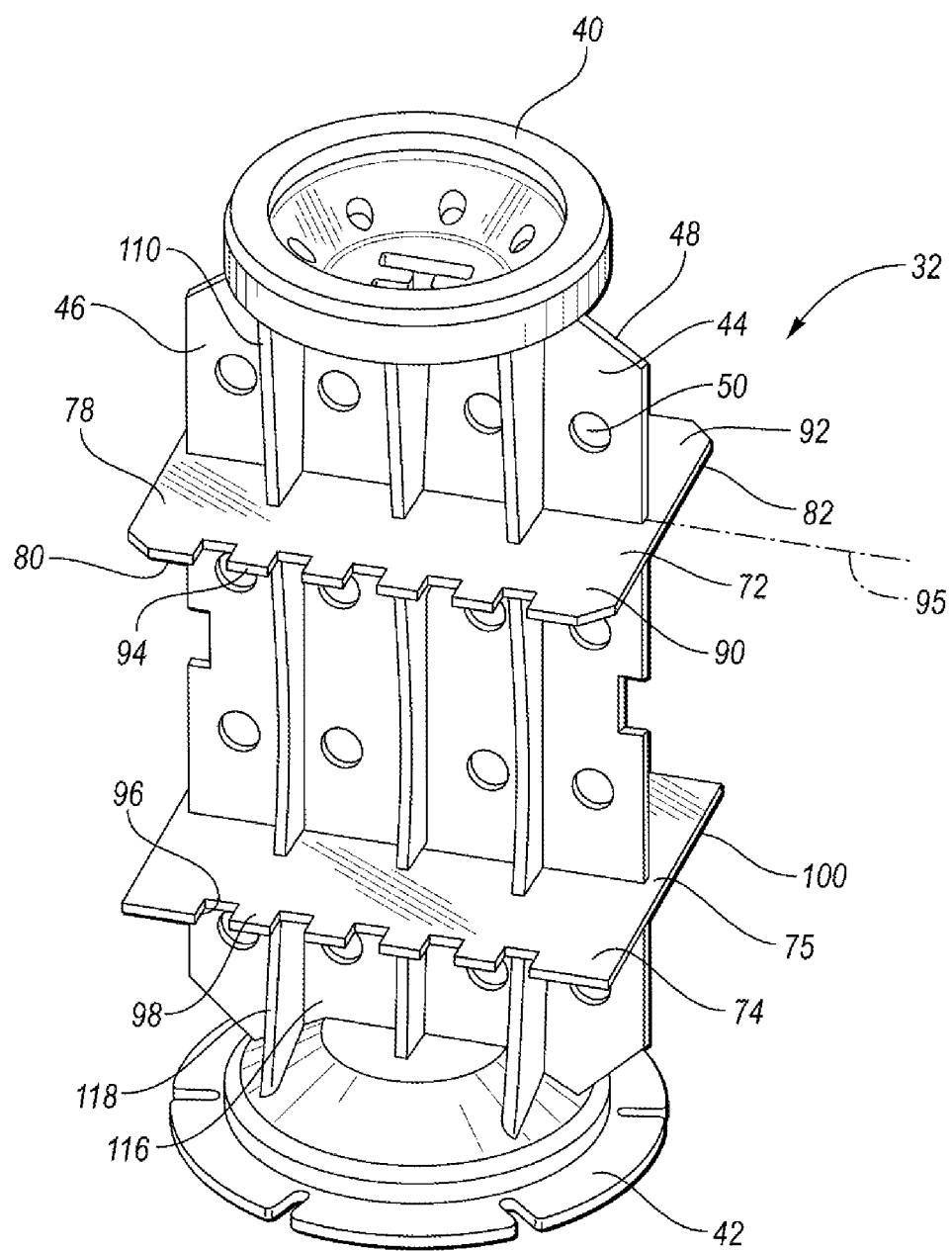
FIG. 2 is a perspective view of an anti-slosh reinforcement column of the fuel tank.
Figure 4:
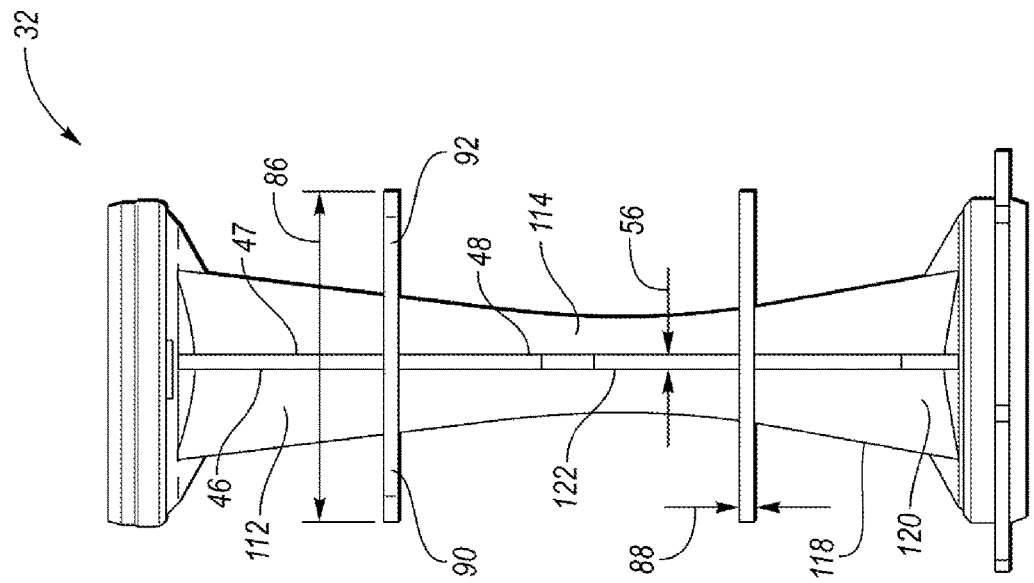
FIG. 4 is a side view of the anti-slosh reinforcement column.
Figure 3:
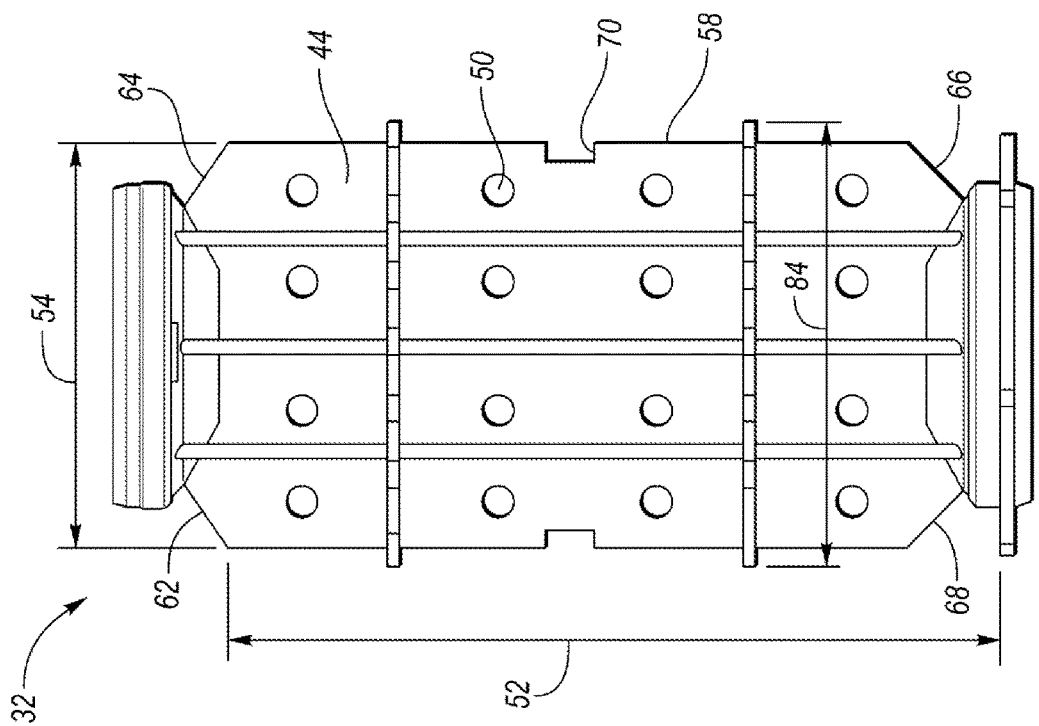
FIG. 3 is a front view of the anti-slosh reinforcement column.

Referring to FIGS. 2 through 4, an example first anti-slosh reinforcement column 32 includes an upper mount 40 attachable to the ceiling 28 and a lower mount 42 attachable to the floor 26. A vertical member, which may be referred to as vertical baffle 44, extends from the lower mount 42 to the upper mount 40. The vertical member is the backbone of the column and discourages the flow of fuel. The vertical baffle 44 is a planar member having large major faces 46, 47 that are interconnected by thin edges 48. A plurality of apertures 50, such as circular holes, are provided completely through the vertical baffle 44 and extend between the major faces 46, 47. The vertical baffle 44 includes a longitudinal or height direction 52, a width direction 54, and a thickness that direction 56 between the opposing major faces. The vertical baffle 44 may include substantially straight side edges 58, 60 and angular edges 62, 64, 66, and 68 that connect between the side edges and the upper and lower mounts. The side edges 58, 60 may define notches 70 located roughly at the midpoint of the height direction 52.

One or more horizontal baffles are rigidly supported on the vertical baffle 44 to suspend the horizontal baffle(s) between upper and lower mounts. In the tank 20, the reinforcement columns 32 include a pair of horizontal baffles 72 and 74 that are vertically spaced apart, whereas the reinforcement columns 34 include a single horizontal baffle 76. The horizontal baffles 72, 74 are planar members having large upper and lower faces 78, 80 and the thin edges 82. The horizontal baffles bisect the vertical baffle and are substantially perpendicular to the vertical baffle 44. Used herein, "substantially perpendicular" means within ±5° of true perpendicular.

The horizontal baffles include a longitudinal or length direction 84, a width direction 86, and a thickness direction 88. Each horizontal baffle 72, 74 may have different width dimensions in the direction 86. The horizontal baffles 72, 74 may have a larger length than the width 54 of the vertical baffle creating short overhangs 75. The horizontal baffles 72, 74 may be centered on the vertical baffle 44 such that the width 54 of the vertical baffle 44 extends along the longitudinal centerline 95 of the horizontal baffles. The creates a first half or portion 90 of the baffle extending from the first major face 46 and a second half or portion 92 extending from the second major face 47. Alternatively, the horizontal baffles may not be centered on the vertical baffles such that the first portion(s) are have a larger surface area than the second portion(s). Side edges 94 of the horizontal baffles may define one or more notches or cutouts 96. The notches 96 may be a plurality of notches arranged in a linear line.

The notches 96 cooperate to define teeth 98 between the notches. While the notches and teeth are illustrated as square, other shapes are contemplated. The notches 96 may be provided on both the first half 90 and the second half 92 or may be provided only one of the halves. Alternatively or additionally, the side edges 100 may include notches and teeth (not shown).

The anti-slosh reinforcement column 34 may also include a plurality of fins 110. The fins 110 may be perpendicular with the vertical baffle 44 and the horizontal baffles 72, 74. The fins 110 may be provided on both first major faces 46, 47 or only on one of them. In the illustrated embodiment, a first set of fins 112 are attached to the first major face 46 and a second set of fins 114 are attached to the second major face 47. The fins 110 may be arranged in a spaced relationship along the width direction 54 of the major face(s) 46, 47. Each set of fins may include three fins as shown in the illustrated embodiment, or alternatively, may include more or less fins in other embodiments.

Each fin 110 may extend longitudinally from the upper mount 40 to the lower mount 42. In other embodiments, the fins may only extend partially between the upper and lower mounts. The fin 110 includes an inner edge 116 connected to the major face and an outer free edge 118. The distance between the inner and outer edges may be referred to as a height of the fin. As shown in FIG. 4, the height of the fin varies along its length and is taller at the ends 120 than in the midpoint 122. The profile of the outer edge 118 may be generally parabolic as shown in the illustrated embodiment. Alternatively, the height may be stepped, extend at multiple straight angles, or the like. The thickness of the fin is substantially less than the length and height and may be uniform along its length. Within each set, the fins may vary in size and shape. For example, in set 112, the outer fins may be the same and the middle fin may be different. In the illustrated embodiment, the height of the middle fin is less than the heights of the outer fins.

The fins 110 may be thought of as continuous along their length extending through and bisecting the horizontal baffles 72, 74. Although, in actual construction, the fins, the vertical baffle, and the horizontal baffles may be an integrally formed component. For example, these components may be an integrally formed injection molded plastic or metal casting. Alternatively, the components may be separately formed and assembled together.

The fins of the first set 112 may be aligned with the fins of the second set 114, i.e., the placement of the fins in the width direction 54 are the same. Alternatively, the fins of the first and second sets may be offset relative to each other in the width direction 54. The height directions of the fins 110 are perpendicular to the major faces of the vertical baffle 44, and the longitudinal directions or lengths of the fins 110 are perpendicular to the upper and lower faces of the horizontal baffles 72, 74.

The fins, the vertical baffle, and the horizontal baffles, in conjunction with the notches and apertures, cooperate to create a series of multidirectional panels, grids, and/or surfaces that grip and trap the fuel inhibiting excessive sloshing and thereby reducing slosh noise and slosh forces below acceptable levels.

In addition to the anti-slosh properties, the intersecting fins, vertical baffle, and horizontal baffles provide a strong structural column for supporting the body of the tank 20. The perpendicularity of these components create strength in all three directions of space.

Whenever a travelling wave of fuel approaches a tank surface, it collides with vertical walls (front or rear) of the tank and then climbs up and collides with the ceiling of the tank. The wave impact with ceiling of the tank may be more critical than the sidewalls. The above-described columns improves slosh performance by reducing fuel tank pressure impacts and force over the tank surfaces. The columns provide slosh mitigation by combining benefits of a horizontal baffle and a vertical baffle packaged together in a single support column. The anti-slosh columns retard the vertical motion of the liquid waves via the horizontal baffles thereby suppressing the wave amplitude, and the vertical baffles dissipate kinetic energy of the waves to reduce the flow of the fuel. Under certain driving conditions and fill levels, the slosh waves may rise above horizontal baffles. For such cases, the vertical leg of the proposed column also provides secondary slosh mitigation.

Referring back to FIG. 1, the second set of anti-slosh columns 34 may be shorter than the first columns 32 due to the reduced height of the tank in those locations. As such, the second columns 34 may only include a single horizontal baffle 76. The second columns 34 may be otherwise similar to the columns 32 including a single vertical baffle, and one or more sets of fins. For brevity, please refer above to the structure for the second columns 34. FIG. 1, of course, is just one example. In some embodiments, the taller columns may include three or more horizontal baffles and the shorter columns may include two or more horizontal baffles. While the embodiment of FIG. 1 includes two types of columns, in other embodiments, the reinforcement columns may be of three or more different types.

The anti-slosh columns provide structural support to the fuel tank as well as reducing slosh to reduce fuel tank vibrations and unwanted slosh noise. The proposed fuel tank improves slosh performance by reducing fuel tank pressure impacts and force over the tank surfaces. The anti-slosh columns provide slosh mitigation by combining benefits of a horizontal baffle and a vertical baffle. This retards the vertical motion of the liquid adjacent to tank walls (horizontal baffle effect), thereby suppressing the wave amplitude and reduces lateral and longitudinal flow.

Figure 7:
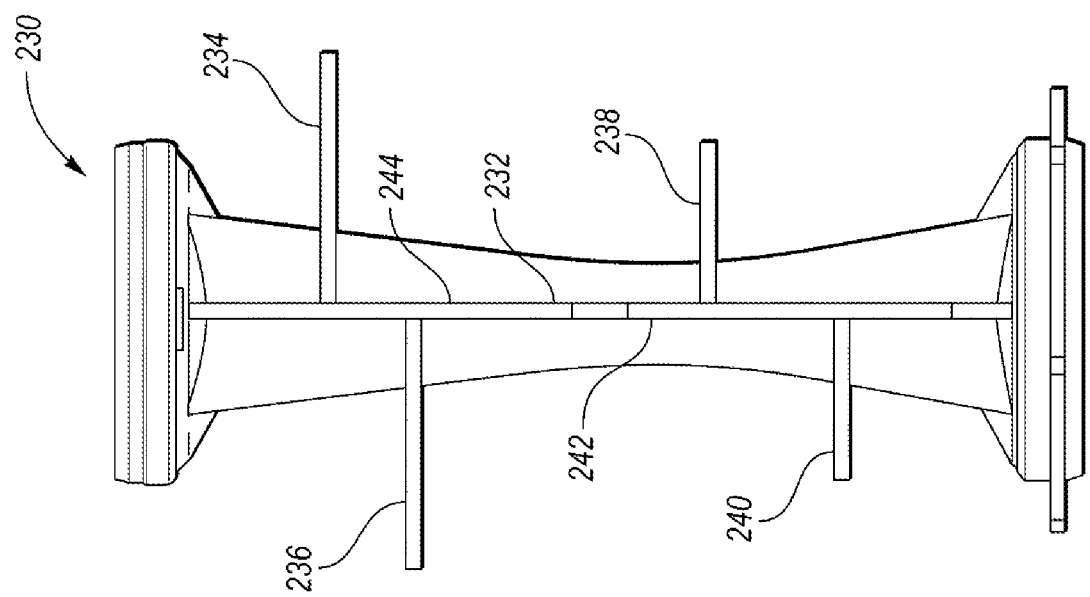
FIG. 7 is a side view of an anti-slosh reinforcement column according to yet another alternative embodiment.
Figure 6:
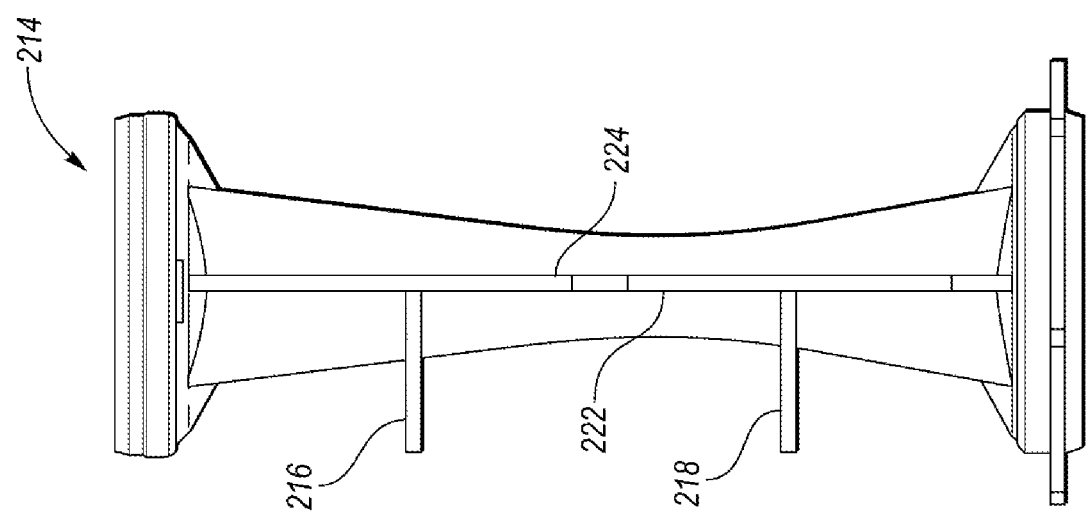
FIG. 6 is a side view of an anti-slosh reinforcement column according to another alternative embodiment.
Figure 5:
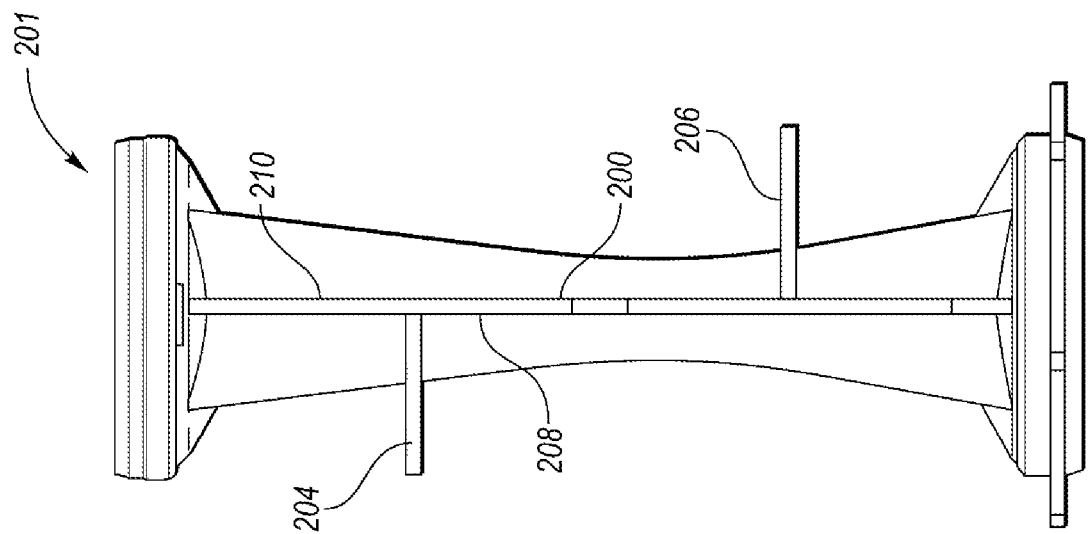
FIG. 5 is a side view of an anti-slosh reinforcement column according to an alternative embodiment.

FIGS. 5, 6, and 7, illustrate three alternative embodiments of the anti-slosh reinforcement columns. In each of these embodiments, the reinforcement columns include a vertical baffle 200 and one or more fins 202 as described above. In the column 201 of FIG. 5, the horizontal baffles 204 and 206 only extend from one side of the vertical baffle 200. For example, the horizontal baffle 204 extends from a first face 208 of the vertical baffle and the horizontal baffle 206 extends from a second face 210 of the vertical baffle. In the illustrated embodiment, the horizontal baffles 204 and 206 have a same width, e.g., project a same distance from the vertical baffle, however, in alternative embodiments, the widths may be different, similar to that shown in FIG. 7.

In the column 214, a pair of horizontal baffles 216 and 218 extend from a first side 220 of the vertical baffle 222. The second side 224 of the vertical baffle 222 does not have any horizontal baffles. The horizontal baffles may have a same width as shown, or may have different widths as shown in FIG. 7. An alternative embodiment, column 214 may only include a single horizontal baffle extending from one face of the vertical baffle 222, similar to the shorter reinforcement columns 34.

The column 230 has horizontal baffles on each side of the vertical baffle 232, but each baffle only extends from one of the sides of the vertical baffle and the horizontal baffles are vertically offset relative to each other. In this embodiment, the column 230 has four horizontal baffles 234, 236, 238, and 240. The baffles 234, 238 extend from a first face 242, and the baffles 236, 240 extend from a second face 244. The baffles 236 and 234 are vertically offset relative to each other unlike the embodiment shown in FIGS. 2 through 4. The baffle 234 may be wider than the baffle 238, and the baffle 236 may be wider than the baffle 240. The baffles 234 and 236 may have a same width, and the baffles 238, 240 may have a same width. Alternatively, each of the baffles may have a unique width. The horizontal baffles shown in FIGS. 5 through 7 may be similar to the horizontal baffles described in FIGS. 1 through 4 except for the differences specifically discussed above.

A fuel tank may include any combination of any of the above described anti-slosh reinforcement columns. The reinforcement columns may be arranged and shaped to optimize the desired fuel flow within the fuel tank.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A fuel-storage tank for a vehicle comprising:
   a body defining an interior volume configured to store fuel; and
   a plurality of anti-slosh reinforcement columns extending between a floor and a ceiling of the interior, at least one of the columns including:
   upper and lower mounts attached to the ceiling and floor, respectively,
   a planar vertical baffle extending from the lower mount to the upper mount and having opposing first and second major faces, and
   a planar horizontal baffle rigidly supported on the vertical baffle to suspend the horizontal baffle between the upper and lower mounts, wherein the horizontal baffle has a first portion extending from the first face and a second portion extending from the second face, and
   a fin extending from the first major face, wherein the fin includes an inner edge connected to the one of the major faces and an outer edge, and wherein a distance between the inner and outer edges varies along a length of the fin.

2. The fuel-storage tank of claim 1, wherein the horizontal baffle has a peripheral edge with a plurality of notches.

3. The fuel-storage tank of claim 1, wherein the vertical baffle defines a plurality of apertures extending through the first and second major faces.

4. The fuel-storage tank of claim 1, wherein the at least one column further includes a fin extending from the first major face.

5. The fuel-storage tank of claim 4, wherein the horizontal baffle is perpendicular to a longitudinal direction of the fin.

6. The fuel-storage tank of claim 5, wherein the fin extends through the horizontal baffle plate.

7. The fuel-storage tank of claim 4, wherein the fin extends from the upper mount to the lower mount.

8. The fuel-storage tank of claim 1, wherein the distance is larger at ends of the fin than at a midpoint of the fin.

9. The fuel-storage tank of claim 1, wherein the fin is a first set of fins that are arranged across a width of the first face with spacing therebetween and the at least one column further includes:
  a set of second fins extending vertically from the upper mount to the lower mount to bisect the horizontal baffle plate, each of the second fins having an inner edge connected to the second major face and extending substantially perpendicular therefrom to a free outer edge, wherein the second fins are arranged across a width of the second face with spacing therebetween.

10. The fuel-storage tank of claim 9, wherein the first fins are aligned with corresponding ones of the second fins.

11. The fuel-storage tank of claim 1, wherein the horizontal baffle is a pair of baffles that are vertically spaced from each other.

12. A fuel-storage tank for a vehicle comprising:
  a body defining an interior volume having a floor and a ceiling and configured to store fuel; and
  an anti-slosh reinforcement column extending between the floor and the ceiling, the anti-slosh reinforcement column including:
    a vertical baffle extending between the floor and the ceiling and having opposing first and second major faces and edges extending therebetween,
    a horizontal baffle having upper and lower major faces and edges extending therebetween, the horizontal baffle being rigidly supported on the vertical baffle such that the first and second major faces are substantially perpendicular to the upper and lower major faces, wherein the horizontal baffle includes an inner edge connected to the first major face, and
    a second horizontal baffle having an inner edge connected to the second major face, wherein the horizontal baffle and the second horizontal baffle are vertically offset relative to each other, wherein the horizontal baffle is wider than the second horizontal baffle.

13. The fuel-storage tank of claim 12, wherein the column further includes a fin extending between the floor and the ceiling such that the fin is substantially perpendicular to the horizontal and vertical baffles.

14. The fuel-storage tank of claim 13, wherein the fin includes an inner edge connected to the first major face and extends therefrom to an outer edge, and wherein a distance between the inner and outer edges varies along a length of the fin.

15. The fuel-storage tank of claim 12, wherein the horizontal baffle includes an inner edge connected to the first major face, and further including a second horizontal baffle having an inner edge connected to the second major face, wherein the horizontal baffle and the second horizontal baffle are vertically offset relative to each other.

16. The fuel-storage tank of claim 12, wherein one of the edges of the horizontal baffle defines a plurality of notches.

17. A fuel-storage tank for a vehicle comprising:
  a body having a floor, a ceiling, and at least one sidewall defining an interior volume configured to store fuel;
  a first reinforcement column extending from the floor to the ceiling, the first reinforcement column including a planar vertical baffle and a planar horizontal baffle being rigidly supported on the vertical baffle; and
  a second reinforcement column extending from the floor to the ceiling, the second reinforcement column including a planar vertical baffle and a pair of planar horizontal baffles being vertically spaced from each other, the pair of horizontal baffles being rigidly supported on the vertical baffle of the second column, wherein the second reinforcement column has more horizontal baffles than the first reinforcement column.

18. The fuel-storage tank of claim 17, wherein the first reinforcement column further includes a vertically extending fin that is substantially perpendicular to the horizontal and vertical baffles, and wherein the second reinforcement column further includes a vertically extending fin that is substantially perpendicular to the pair of horizontal baffles and the vertical baffle.

19. The fuel-storage tank of claim 17, wherein the vertical baffle of the first reinforcement column defines a hole extending through a thickness of the thereof.

20. The fuel-storage tank of claim 17, wherein the a first reinforcement column further includes a fin having an inner edge connected to the vertical baffle of the first column and an outer edge, and wherein a distance between the inner and outer edges varies along a length of the fin.

* * * * *